Figure 1:
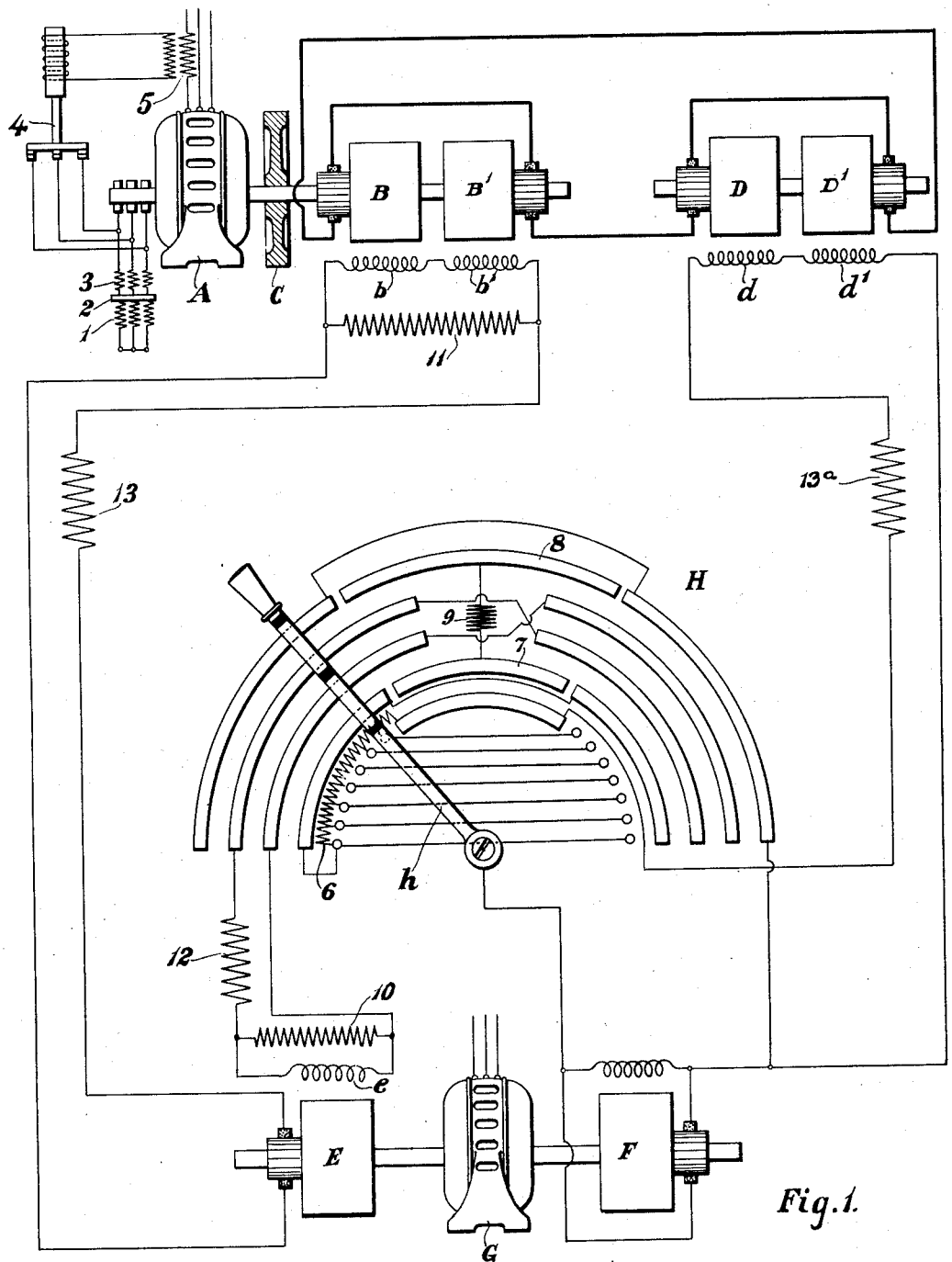

No. 865,812. PATENTED SEPT. 10, 1907.
W. H. POWELL.
MOTOR CONTROL SYSTEM.
APPLICATION FILED APR. 16, 1906.

2 SHEETS—SHEET 2

WITNESSES
Oliver W. Sharman
Fred J. Kinsey

INVENTOR
William H. Powell
By
Chas. E. Lord
ATTORNEY

UNITED STATES PATENT OFFICE.

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MOTOR-CONTROL SYSTEM.

No. 865,812.  Specification of Letters Patent.  Patented Sept. 10, 1907.

Application filed April 16, 1906. Serial No. 311,827.

*To all whom it may concern:*

Be it known that I, WILLIAM H. POWELL, a citizen of the United States, residing at Norwood, in the county of Hamilton and State of Ohio, have invented certain new and useful Improvements in Motor-Control Systems, of which the following is a full, clear, and exact specification.

My invention relates to motor control systems and particularly to control systems for mill and hoisting motors.

In rolling mills and in hoisting machinery it is necessary that the moving parts be quickly and often reversed. Heretofore, these have been driven mostly by steam engines. It has been proposed, however, to have electric motors for doing this work and to have a special generator, on whose shaft is a flywheel, for each motor, the regulating and reversing of the motor being accomplished solely by varying and reversing the field of the generator. This arrangement is very unsatisfactory because it necessitates generators and motors of much greater capacity than required by the load on the motor, for on account of the system of regulation employed, the maximum voltage is used with a current much below the maximum and the maximum current with a voltage much less than the maximum. Moreover, the maximum current flows in the generator armature when the generator field is very weak, thus causing much trouble from faulty commutation. A further disadvantage is that the time required for the reversal is too great, especially in rolling mills, where a reversal of direction must be made every few seconds. For example, in one rolling mill, the direction of the motion must be reversed on an average of every five and a half seconds.

It is the object of my invention to overcome these disadvantages, and to provide a motor control system of great adaptability and with a wide range of speed control.

With my invention the size of the generators and motors may be very greatly reduced, because the maximum current is demanded at the same time or nearly the same time that the voltage is the greatest. The commutation is also facilitated because the generator has a comparatively strong field when the greatest current is demanded. Moreover, the time required for the reversal is greatly decreased because of the diminished time constant of the generator field magnet.

With these objects in view I have provided a system in which the armature of the working motor is supplied by a special generator and the fields of both the motor and the generator are variable, generally inversely and preferably in alternate steps, and that of the generator also preferably reversible. To obtain the reversal of the generator electromotive force, the field of said generator may be supplied from a reversible exciter, the field of the motor being also preferably separately excited. In order to diminish the time required for reversal or speed variation, non-inductive resistance may be inserted in the field circuits of one or both machines. The generator is preferably driven by an electric motor and a fly-wheel is connected to said motor, means being provided to cause said motor and flywheel to slow down when the load on the working motor is heavy, so that the motor driving the generator may get assistance from the fly-wheel at such times.

The novel features of my invention will appear from the following description and accompanying drawings and will be particularly pointed out in the claims.

Figure 2:
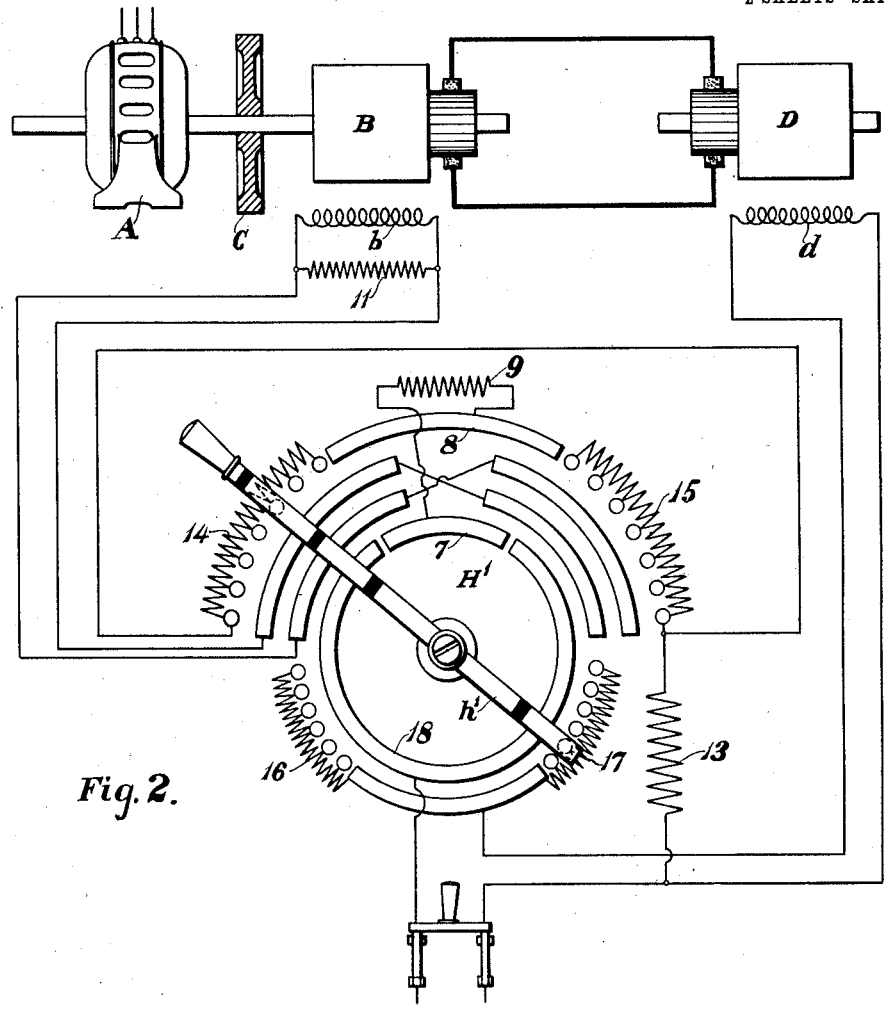
Figure 3:
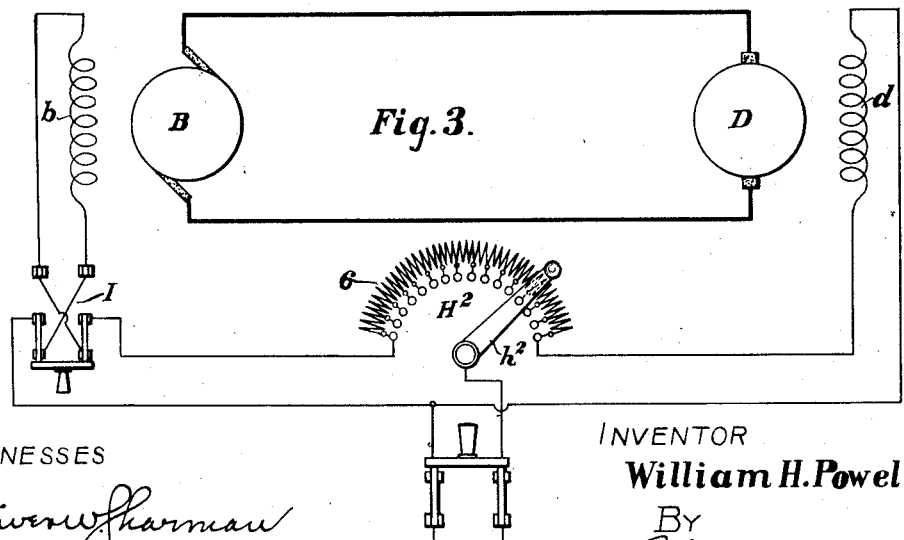

Figure 1 shows my invention with separate sources of current for supplying the field coils of the generator and the working motor and with a single variable resistance in the controller. Fig. 2 shows the generator and motor field coils supplied by the same source of current and separate variable resistances for these field coils; and Fig. 3 is a diagram showing a simple arrangement of connections embodying some features of my invention.

In Fig. 1 A is an electric motor of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength in the primary circuit of the motor, as through a series transformer 5.

Two generator armatures B and B′ are driven by the motor A, being preferably directly connected thereto, and on the common shaft of the motor A and the generators B, B′ is a heavy flywheel C.

The armatures D, D′ of the two working motors are mounted on a common shaft, and are connected in series and supplied with current by the generator armatures B and B′, which are also connected in series.

Two generators and two motors are used merely to diminish the size thereof, for if only one of each were used, it would have to be excessively large. In small plants, and if desired in large ones, one generator and one motor only may be used if desired, and such an arrangement is shown in Figs. 2 and 3.

The field coils $b$, $b'$ of the generators are supplied by a generator E, whose field $e$ is excited by a self-excited generator F, which also supplies the field coils $d$, $d'$ of the working motors. The generators E and F are driven by a prime mover or any other source of power, preferably by a three-phase induction motor G.

The rheostat or controller H is arranged to control the resistances of the field circuits $d$, $d'$ and $e$, and to reverse the current through coil $e$. The arm or handle $h$ of this controller is divided by insulation into several parts, electrically distinct from each other. The inner part of the arm is connected to one terminal of generator F. There is a single variable resistance 6 for the controller, one part of which is in the field circuit $e$ of the generator E and the other part of which is in the field circuit $d$, $d'$ of the working motors. The controller is arranged to vary the relationship of these two parts, thereby inversely varying the field strengths of the working motor and the generator. This variation of the resistances of the two field circuits takes place in alternate steps, for the controller in its movement from one contact button to the next varies the motor speed in two distinct steps, the first by cutting a section of the resistance out of one field circuit by bridging or shunting said section and the second by cutting said section into the other field circuit by opening said shunt. By varying the width of the controller arm at the contacts, the width of the contacts themselves, and the space between adjacent contacts, the extent of movement of the controller arm may be made the same for each step, or the same for alternate steps while different for successive steps. The controller is also arranged to reverse the direction of current through coil $e$, making this reversal after the strength of the said coil has been reduced to a minimum and when the working motor field strength is a maximum. The ohmic resistances of the coils $b$, $b'$ and $d$, $d'$, and of resistance 6 are properly proportioned to get the desired variations. Between the segments 7 and 8 of the controller is arranged a resistance 9, to take up the field discharge when the circuit through coil $e$ is broken. The resistance 9 is aided in this by a high resistance 10 permanently connected across the coil $e$. The variations of strength of field coil $e$ are reproduced proportionately by field coils $b$, $b'$, the generator E merely serving as a sort of direct current step-up or step-down transformer, as the case may require. A resistance 11 for a purpose similar to that of resistance 10 may be connected across the field coils $b$ and $b'$.

Non-inductive resistances 12 and 13, are connected in series with the field coils $e$, and $b$, $b'$ respectively. These resistances have an ohmic value several times as great as the field coils with which they are in series. The purpose of these resistances is to diminish the time constant of the field magnets $e$ and $b$, $b'$, for the time constant of a circuit is a function of its inductance divided by its resistance. Thus by increasing the resistance of the field circuits without increasing their inductance, the current strength being kept the same by increasing the voltage in proportion to the resistance, the time constants of the field magnets are greatly reduced. By this means quick reversals of the motors D and D' can be readily obtained. If desired such a resistance 13$^a$ may also be placed in the working motor field circuit, in order to reduce its time constant.

The operation of the system is as follows. The primary circuit of motor A is closed and the motor accelerated by the cutting out of the starting resistance 1 by the bar 2. The switch 4 is held open by its solenoid at this time because of the heavy current required for starting the motor. If desired, other means may be used to insure the open condition of this switch during starting. After all the starting resistance 1 has been cut out and the motor has gained sufficient speed, the solenoid switch is allowed to close to cut out resistance 3, because of the decrease in the primary current of motor A. The flywheel C and generator armatures B and B' are also started with the motor A, and the flywheel stores mechanical energy by its rotation. During this starting the arm $h$ is preferably in its vertical or "off" position. The motor G and generators E and F are started in any desired manner. The motor fields $d$ and $d'$ are now at their strongest, while the generator fields $b$ and $b'$ are deënergized because the generator E, though rotating, has its field coil disconnected. The arm $h$ is now gradually moved from the vertical towards the horizontal, in the proper direction to give the motors D and D' the desired direction of rotation. As this arm moves it first connects the field coil $e$ to the generator F through the whole resistance 6, and then, step by step, cuts said resistance out of the circuit of coil $e$ and, in steps which alternate with the aforesaid steps, cuts it into the circuit of coils $d$ and $d'$. The fields $b$ and $b'$ vary in strength in the same proportion as the field $e$. Thus the armatures D and D' are supplied with current at a constantly increasing voltage while the magnetic fields in which they revolve are constantly decreasing in strength, causing the motors to rapidly gain speed. The alternate variation of the resistances of the two field circuits makes the speed changes of the working motor twice as gradual as a simultaneous variation would.

If the load is heavy the working motors require more power than the motor A can furnish, and the current rising in the primary of transformer 5 by reason of this heavy load, the switch 4 is opened, thus inserting resistance 3 in the rotor circuit of motor A. The slip of motor A is therefore increased, and the motor is permitted to slow down slightly, thus allowing the flywheel C to give up some of the mechanical energy it has stored, which energy helps the motor to drive the generators B and B' to supply electrical energy at the rate demanded by the motors D and D' to drive their load. The speed which the motors D and D' acquire depends on the extent of movement of the arm $h$, the full speed being reached when the arm $h$ is in the horizontal position, when the whole resistance 6 is in the field circuit $d$, $d'$, and none of it in the field circuit $e$. As the arm is moved back toward the vertical the fields $d$ and $d'$ are strengthened and the electromotive force of generators B and B' is decreased, thus slowing down the motors D, D' by causing them to act as generators to supply current to the armatures B, B' which now serve as motors to help restore energy to the flywheel C. There is a powerful braking effect on the working motors, due to their acting as generators. The diminished current in the primary of transformer 5 also causes the solenoid switch 4 to close thereby increasing the speed of motor A, so that the latter may also supply energy to the flywheel C. When the arm $h$ leaves the contacts of resistance 6 and slides over the segments 7 and 8, the resistance 9 is connected in circuit with the coil $e$ to take the field discharge therefrom, the resistance 12 assisting in this. When the arm $h$ is moved in the other direction from the vertical, the above cycle is repeated save that the motors D and D' rotate in the other direction.

In Fig. 2 a very similar arrangement is shown. In this view, however, the motor A drives but one generator armature B and the flywheel C, and the armature B supplies but one motor armature D. The field coils $b$ and $d$ of the generator and motor are here supplied from the same source of current, which may be any direct current source. The generator E of Fig. 1 is entirely omitted, the controller H' varying the strength of the field $b$ directly instead. In shunt to the field coil $b$ is the high resistance 11 to partially take up the field discharge, and in series therewith is the resistance 13, to reduce the time constant of the generator field magnet. This resistance 13 is here shown so that it is not included in circuit during the field discharge from coil $b$. The controller H' is also here differently arranged. There are two sets of variable resistances, one set of which, resistances 14 and 15, are for the generator field circuit, and the other set, 16 and 17, for the working motor field circuit. With separate resistances for the generator and motor field circuits, it is possible to make the motors and generators substantial duplicates of each other, which is generally impossible if the same resistance is used, because of the different variations to be produced in the two fields. Therefore, the arrangement with separate resistances in these field circuits is usually deemed preferable. Instead of having two separate resistances for each field circuit there may be but one such resistance, the two sets of contacts being cross connected as shown in Fig. 1. Instead of connecting the source of supply to the controller arm, it is here connected to the ring 18. The resistances 16 and 17 are arranged below the pivot of the controller arm, and coact with a downward extension of said arm. As before, the rheostat arm $h'$ is divided into several electrically distinct parts. The resistance 9 is connected, as in Fig. 1, between the segments 7 and 8, but here takes up the field discharge from coil $b$. In order to simplify the drawing no starting or regulating resistances for the induction motor have been here shown.

The operation of the system shown in Fig. 2 is substantially the same as that of Fig. 1, save that the field strength of generator B is varied directly by the controller by changing the resistance of its field circuit, instead of indirectly by changing the resistance of the field circuit of an exciter for the main generator field coils.

The diagram of Fig. 3, shows the generator armature B supplying the motor armature D, the field coils $b$ and $d$ being supplied from any suitable common source and controlled by a single rheostat $H^2$, the arm $h^2$ of which is arranged to gradually transfer the resistance 6 from the generator field circuit to the motor field circuit and vice versa. The rheostat is not arranged to reverse the current in the generator field circuit, as in Figs. 1 and 2, but instead there is a reversing switch I which does this. The reversing switch I should only be thrown when the rheostat arm $h^2$ is in its extreme right hand position, when the full resistance 6 is in the generator field circuit. The generator B may be driven by any source of power, and may have a flywheel on its shaft if desired. By moving the arm $h^2$, the strength of field $d$ and the electromotive force of armature B are inversely varied in alternate steps.

With my invention it is possible to more quickly reverse motors of large capacity than has heretofore been done, and with less waste of energy. The motor D, or the motors D, D' if two of them are used, can be reversed from full speed in one direction to full speed in the other in a very few seconds, part of this result being due to the small time constant of the generator field magnet, part to the inverse variations of the motor field strength and the electromotive force impressed on the motor armature, and part to storage of energy in the flywheel which can give up millions of foot pounds of energy. If with a 10% drop in speed of the motor A, the flywheel gives out twenty million foot pounds of energy at a uniform rate for thirty seconds, about twelve hundred horse power is developed for that period, this extra power helping the motor A to drive generators B, or B, B', to supply current to the working motor D or D, D', during the peak of the load. Thus the motor A is not required to be large enough to carry the full load, but only slightly more than the average load, the flywheel serving to steady the load thereon. Moreover, because of the inverse varying of the fields of the machines B and D, the maximum current and maximum voltage are demanded at nearly the same time while with previous arrangements having the same horse power the maximum voltage came when the current was very small, and vice versa. For this reason the size and capacity of the machines B and D can be very greatly reduced.

There is still another great advantage of my invention. The maximum armature current is less, and flows when there is a stronger field magnetism in the generator, thus greatly assisting commutation.

There are many other advantages of my invention which it is unnecessary to point out as they will be obvious to one skilled in the art.

When I use the term "inversely" in this description and in the claims, I do not wish to limit myself to exact 'inverse proportion", but intend the term to include any increase in one and decrease in the other of the two things specified.

I have described my invention with some particularity in what I now consider to be its preferred form, but I do not wish to be limited to the precise arrangement and construction shown and described. All the obvious modifications which would readily occur to one skilled in the art I claim as coming under the broad scope of my invention.

What I claim as new and desire to secure by Letters Patent is:—

1. The method of operating an electric motor at variable speed, which consists in supplying mechanical energy at a substantially uniform rate, transforming the mechanical energy into electrical energy, supplying the electrical energy to the motor, inversely varying the electromotive force of the electrical energy and the field strength of the motor in alternate steps, storing any excess of the supplied mechanical energy beyond that demanded by the motor at any time, and supplying said stored energy to the motor whenever required.

2. The method of operating an electric motor at variable speed, which consists in varying its field strength, inversely varying the electromotive force impressed on its armature, storing as mechanical energy any excess of supplied energy when the load on the motor is light, and supplying said stored energy to the motor as electrical energy whenever the load on the motor is heavy.

3. The method of operating an electric motor at variable speed, which consists in converting mechanical energy into electrical energy, supplying the electrical energy to the motor, inversely varying in alternate steps the electromotive force of the electrical energy and the field strength of the motor, storing any excess of the mechanical energy when its rate of supply exceeds the power demanded by the motor at any time, and supplying said stored energy to the motor as electrical energy whenever the power demanded by the motor is above that normally supplied.

4. The method of regulating the speed of an electric motor, which consists in supplying mechanical energy at a substantially uniform rate, converting said mechanical energy into electrical energy at a variable rate, supplying the electrical energy to the armature of the motor, energizing the field of the motor from a separate source, inversely varying in alternate steps the electromotive force of the electrical energy and the field strength of the motor, storing any excess of mechanical energy when its rate of supply exceeds the rate at which the electrical energy is required, and supplying said stored energy to the motor as electrical energy whenever the electrical energy is demanded at a rate which exceeds the normal rate at which the mechanical energy is supplied.

5. The method of reversing an electric motor, which consists in first strengthening its field and diminishing to zero the electromotive force impressed on its armature, and then weakening its field and increasing in the reverse direction the electromotive force impressed on its armature.

6. The method of controlling the speed of an electric motor, which consists in supplying its armature from one source of current, supplying its field from another source of current, and inversely varying the electromotive force of said first source of current and the field strength of the motor.

7. The method of varying the speed of an electric motor, consisting in converting mechanical energy into electrical energy, supplying the electrical energy to the motor armature, supplying the field of the motor from a separate source, and inversely varying alternately step by step the electromotive force of the electrical energy and the field strength of the motor.

8. The method of controlling an electric motor, consisting in rotating a generator armature in a magnetic field, supplying the current from the generator armature to the armature of the motor, energizing the generator field and the motor field from a separate source of current, and inversely varying the field strengths of the generator and the motor in alternate steps.

9. The method of regulating and reversing an electric motor, which consists in supplying its armature from one source of current, supplying its field from another source of current, diminishing to zero the electromotive force of said first source of current and strengthening the motor field, and then increasing in the reverse direction the electromotive force of said first source of current and weakening the motor field.

10. The method of operating an electric motor at a variable speed and load, consisting in inversely varying its field strength and the electromotive force impressed on its armature, storing as mechanical energy the excess of energy when the supplied power exceeds the power demanded by the load, and supplying said stored energy to the motor as electrical energy when the power demanded by the load exceeds the supplied power.

11. The method of operating an electric motor at a variable speed and load, which consists in supplying mechanical energy, converting it into electrical energy, supplying the electrical energy to the motor, inversely varying in alternate steps the electromotive force of said electrical energy and the field strength of said motor, storing any excess of the mechanical energy supplied when its rate of supply exceeds the rate at which energy is demanded by the load, and supplying said stored energy to the motor as electrical energy when energy is demanded by the load at a rate which exceeds the rate at which the mechanical energy is supplied.

12. A system of motor control, comprising a dynamo-electric generator driven by a source of substantially constant power, a motor supplied by the generator, means for inversely varying the electromotive force of the generator and the field strength of the motor, and means for mechanically storing any excess of energy supplied by the driving source and supplying said stored energy to the motor whenever required.

13. A system of motor control, comprising a motor, means for inversely varying its field strength and the electromotive force impressed on its armature alternately step by step, and means for mechanically storing any excess of supplied energy when the load on the motor is light and for supplying said stored energy to the motor as electrical energy when the motor load is heavy.

14. A system of motor control, comprising a dynamo-electric generator, a motor supplied thereby, means for inversely varying the electromotive force of the generator and the field strength of the motor, means for storing any excess of the mechanical energy supplied to the generator when its rate of supply exceeds the power demanded by the motor at any time, and means for causing said stored energy to be supplied to the motor whenever the power demanded by the motor is above that normally supplied.

15. A motor control system comprising a source of substantially constant mechanical power, a generator driven thereby, a variably loaded motor whose armature is supplied by the generator, a separate source of current which supplies the field of the motor, means for inversely varying the electromotive force of the generator and the field strength of the motor, in alternate steps, means for storing any excess of mechanical energy supplied by the source when its rate of supply exceeds the rate at which electrical energy is demanded by the load on the motor, and means for causing said stored energy to be supplied to the motor as electrical energy whenever the electrical energy is demanded at a rate which exceeds the normal rate at which the mechanical energy is supplied.

16. A system of motor control, comprising a motor, and means for first increasing the strength of its field and diminishing to zero the electromotive force impressed on its armature, and for then weakening its field and increasing in the reverse direction the electromotive force impressed on its armature.

17. A motor control system comprising a motor, a source of current for supplying the motor armature, a second source of current for supplying the motor field coil, and means for inversely varying the electromotive force of said first source of current and the field strength of the motor in alternate steps.

18. A motor control system comprising a dynamo-electric generator, a motor whose armature is supplied by said generator, a separate source of current for supplying the field coil of the motor, and means for inversely varying the electromotive force of the generator and the field strength of the motor alternately step by step.

19. A motor control system comprising a dynamo-electric generator, a motor whose armature is supplied by the generator, a separate source of current for supplying the field coils of the motor and the generator, and means for inversely varying the field strengths of the generator and the motor in alternate steps.

20. A system of motor control, comprising an electric motor, a source of current supplying the motor armature, a second source of current supplying the motor field coil, and means for first diminishing to zero the electromotive force of said first source of current and strengthening the motor field, and then increasing in the reverse direction the electromotive force of said first source of current and weakening the motor field.

21. A motor control system comprising a motor, means for inversely varying its field strength and the electromotive force impressed on its armature in alternate steps, means for mechanically storing any excess of energy when the supplied power exceeds the power demanded by the motor load, and means for causing said stored energy to be supplied to the motor as electrical energy when the power demanded by the motor load exceeds the supplied power.

22. A motor control system, comprising a source of mechanical power, a dynamo-electric generator driven thereby, a motor supplied by the generator, means for inversely varying the electromotive force of said generator and the field strength of said motor, means for storing any excess of mechanical energy supplied by said source when its rate of supply exceeds the rate at which energy is demanded by the motor load, and means for causing said stored energy to be supplied to the motor as electrical energy when energy is demanded by the motor load at a rate which exceeds the rate at which mechanical energy is supplied by the source.

23. In combination, a source of power, a generator driven thereby, a motor supplied by the generator, means for inversely varying the field strengths of the generator and the motor, a flywheel mechanically connected to said source of power, and means for causing the flywheel to give up its energy when the load on the motor rises above the normal.

24. In combination, a source of power, a generator driven thereby, a motor supplied by the generator, means for inversely varying the resistance of the field circuits of the generator and the motor alternately step by step, a flywheel on the generator shaft, and means for allowing said flywheel to give up its energy when the motor load rises above normal.

25. A system of motor control, comprising a motor, two independent sources of current supplying the motor field and armature respectively, and a controller operated by a single handle arranged to vary inversely the resistance of the motor field circuit and the electromotive force of the armature-supplying current source.

26. A system of motor control, comprising a motor, a generator supplying the motor armature, an independent generator supplying the field circuits of the generator and the motor, and means for inversely varying the resistances of said field circuits.

27. A system of motor control, comprising a motor, a generator supplying said motor, a flywheel on said generator shaft, and means for inversely varying the field strengths of said generator and said motor in alternate steps.

28. A system of motor control, comprising a motor, a generator supplying said motor, a flywheel on said generator shaft, means for inversely varying the field strengths of said generator and said motor in alternate steps, and means for permitting the flywheel to give up its energy when the load on the motor is heavy.

29. A system of motor control, comprising a motor, a generator supplying said motor, a flywheel on said generator shaft, means for permitting the flywheel to give up its energy whenever the load on the motor exceeds a predetermined value, and a controller for inversely varying the field strengths of the generator and the motor to vary the speed of the motor and to cause energy to be restored to the flywheel while the motor is being retarded.

30. A system of motor control, comprising a motor, a generator supplying said motor, a flywheel on said generator shaft, means for inversely varying in alternate steps the field strengths of said generator and said motor, and means for causing the generator to run slower when the motor load is heavy than when the motor load is light.

31. A system of motor control, comprising a motor, a generator supplying the armature of said motor, a separate source of current supplying the field coils of said generator and said motor, a flywheel on said generator shaft, and means for inversely varying the field strengths of said generator and said motor alternately step by step.

32. A system of motor control, comprising a motor, a generator supplying the armature of said motor, a flywheel on said generator shaft, means for inversely varying in alternate steps the field strengths of said generator and said motor, and means for allowing the flywheel to give up its energy when the load on the motor is heavy.

33. A system of motor control, comprising a motor, a generator supplying the armature thereof, a flywheel on the generator shaft, means for permitting the flywheel to give up its energy whenever the load on the motor exceeds a predetermined value, and a controller for inversely varying in alternate steps the field strengths of the generator and the motor to vary the speed of the motor and to cause energy to be restored to the flywheel while the motor is being retarded.

34. A system of motor control, comprising a motor, a generator supplying the armature of said motor, a flywheel on said generator shaft, means for inversely varying the field strengths of said generator and said motor in alternate steps, and means for permitting the generator to run slower when the motor is heavily loaded than it does when the motor is lightly loaded.

35. A system of motor control, comprising an induction motor, a generator driven thereby, a flywheel on the shaft of said induction motor, a working motor supplied by said generator, and means for inversely varying the field strength of the working motor and the electromotive force of the generator.

36. A system of motor control, comprising an induction motor, a generator directly connected thereto, a flywheel on the shaft of the induction motor, a working motor supplied by the generator, and means for inversely varying the field strengths of the generator and the working motor in alternate steps.

37. A system of motor control, comprising an induction motor, a generator driven thereby, a flywheel on the shaft of the generator, a working motor supplied by the generator, means for inversely varying the field strengths of the generator and the working motor, and means for allowing the induction motor to run slower when a heavy load is placed on the working motor.

38. A system of motor control, comprising an induction motor, a generator driven thereby, a flywheel on the shaft of the generator, a working motor supplied by the generator, means for inversely varying in alternate steps the field strength of the working motor and the electromotive force of the generator, and means for decreasing the speed of the induction motor when a heavy load is placed on the working motor.

39. A system of motor control, comprising a generator, a motor whose armature is supplied by the generator, a separate source of current for supplying the field coils of the generator and the motor, a permanent resistance in the generator field circuit, variable resistances in the field circuits of the generator and the motor, and means for inversely varying said variable resistances.

40. A system of motor control, comprising a generator, a motor whose armature is supplied by the generator, a separate source of current supplying the field magnets of the generator and the motor, means for inversely varying the resistance of said field circuits and for reversing the direction of current through the generator field circuit.

41. A system of motor control, comprising a generator, a motor whose armature is supplied by the generator, a separate source of current supplying the field magnets of the generator and the motor, means for inversely varying the resistances of said field circuits and for reversing the direction of current through the generator field circuit, and a permanent resistance in the generator field circuit.

42. A system of motor control, comprising a generator, a motor, means for inversely varying the field strengths of the generator and the motor and for reversing the direction of current in the generator field circuit.

43. A system of motor control, comprising a generator, a motor whose armature is supplied thereby, a separate source of current supplying the field coils of the generator and the motor, and means for inversely varying the resistances of said field circuits in alternate steps and for reversing said generator field circuit after its resistance has been increased to the maximum.

44. A system of motor control, comprising a source of current, a motor supplied thereby, a flywheel mechanically connected to said motor, a generator driven by said motor, a second motor supplied by said generator, means for inversely varying alternately step by step the field strengths of said second motor and said generator, and means for allowing said first motor to decrease in speed when the load on the second motor increases.

45. A system of motor control, comprising a generator, a motor supplied thereby, means for inversely varying the field strengths of said generator and said motor and for reversing said generator field, and a resistance permanently in said generator field circuit.

46. A system of motor control, comprising a generator, a motor supplied thereby, means for inversely varying the field strengths of said generator and said motor and for reversing said generator field, and resistances permanently in the field circuits of the generator and the motor.

47. A system of motor control comprising a generator, a motor supplied thereby, resistances in the field circuits of said generator and said motor, means for inversely varying said resistances and for reversing the current in the generator field circuit after the full resistance in said circuit has been cut in, and a high resistance connected across the generator field terminals.

48. A system of motor control comprising a generator, a motor supplied thereby, and a regulating and reversing rheostat so connected and arranged that it inversely varies the resistances of the generator and motor field circuits and can reverse the current in the generator field circuit after the resistance in said circuit has reached its maximum.

49. A system of motor control comprising a generator, a motor whose armature is supplied thereby, a separate source of current for supplying the field coils of said generator and said motor, and a regulating and reversing rheostat so connected and arranged that it inversely varies the resistances of said field circuits and can reverse the current in the generator field circuit when the motor field circuit has its minimum resistance.

50. A system of motor control, comprising a motor, a generator supplying the armature thereof, means for varying the field strengths of the generator and the motor and for reversing the generator field, and a non-inductive resistance permanently in said generator field circuit.

51. A system of motor control, comprising a motor, a generator supplying the armature thereof, a non-inductive resistance permanently in the field circuit of one of said machines, and means for varying the current in the field circuits of both of said machines.

52. In combination, a motor, a generator supplying the armature only of said motor, a separate source of electromotive force for exciting the motor field, a fly-wheel mechanically connected to said generator, and means for varying the speed of the motor by varying the field strengths of both the generator and the motor.

53. In combination, a motor, a generator supplying the armature only of said motor, a separate source of electromotive force for exciting the field of said motor, a fly-wheel on the shaft of said generator, and means for varying the field strengths of both the generator and the motor and for reversing the field of the generator.

54. A motor control system, comprising an electric motor, a separately excited generator supplying the armature of said motor, a fly-wheel mechanically connected to said generator, and means for varying the field strength of said generator.

55. A motor control system, comprising an electric motor, a generator supplying the armature of said motor, a fly-wheel mechanically connected to said generator, means for varying the voltage of said generator, and means for causing said generator and fly-wheel to slow down when the load on the motor is heavy.

56. A motor control system, comprising an electric motor, a generator supplying the armature thereof, a fly-wheel on the shaft of said generator, means for varying the field strength of said generator, and means for causing said fly-wheel and generator to increase or decrease in speed according as the load on the motor falls below or rises above a predetermined value.

57. A system of motor control, comprising a generator, a motor supplied thereby, and means for varying the field strengths of the generator and the motor and for reversing the current in the generator field circuit.

58. A system of motor control, comprising a motor, a generator supplying the armature of said motor, an exciter for the generator field, and means for varying and reversing the field strength of said exciter.

59. A motor control system, comprising an electric motor, a generator supplying the armature of said motor, separate sources of electromotive force for supplying the field windings of said generator and said motor respectively, and means for varying and reversing the electromotive force of the source which supplies the generator field.

60. The method of operating an electric motor at varying speeds, which consists in supplying its armature from a generator, exciting the field of the generator from a separate source of electromotive force, and varying the electromotive force of said separate source.

61. The method of operating an electric motor, which consists in supplying its armature from a generator, exciting the field of the generator from a separate source, and varying and reversing the electromotive force of said separate source.

62. The method of reversing an electric motor, which consists in supplying its armature from a generator, supplying the field of the generator from a separate source of electromotive force, and reversing the direction of the electromotive force of said separate source.

63. A system of motor control, comprising a motor, a generator supplying the armature thereof, a separate source of electromotive force supplying the field of the generator, and means for varying and reversing the electromotive force of said separate source.

64. A motor control system, comprising an electric motor, a generator supplying the armature thereof, an exciter for the generator field, and means for reversing the electromotive force of said exciter.

65. A motor control system, comprising a separately excited generator, a separately excited motor, the armature of which is supplied exclusively by said generator, and means for inversely varying the field strengths of said generator and said motor.

In testimony whereof I affix my signature, in the presence of two witnesses.

WILLIAM H. POWELL.

Witnesses:
GEO. B. SCHLEY,
FRED J. KINSEY.